Sept. 26, 1961 H. T. BONNER 3,002,140

SIGNAL CONTROLLED APPARATUS

Filed Jan. 21, 1959

INVENTOR.
HOWARD T. BONNER
BY Elliott & Pastoriza
ATTORNEYS.

United States Patent Office 3,002,140
Patented Sept. 26, 1961

3,002,140

SIGNAL CONTROLLED APPARATUS

Howard T. Bonner, 2900 Tilden Ave., Los Angeles, Calif.

Filed Jan. 21, 1959, Ser. No. 788,221
13 Claims. (Cl. 318—267)

This invention generally relates to signal controlled apparatus, and more particularly concerns signal controlled devices adapted to be used in conjunction with model airplanes, model train sets and the like.

Although the invention will be described for purposes of illustration from the standpoint of its application to model airplanes, it will be appreciated that the invention is susceptible of advantageous use in a multitude of applications in which radio or signal controlled components are employed.

In applicant's Patent Number 2,858,836, issued October 28, 1958, for "Remotely Controlled Escapement Mechanism for Model Airplanes," a mechanical escapement apparatus is disclosed which basically, although with less precision control and accuracy, complies with the overall application requirements of the present invention. The present invention, however, constitutes an improvement and embodies an electrical servo unit and co-functioning circuitry in place of the magnetically actuated arm and rotating wheel and stops as provided for in the above referred to patent.

It is, therefore, an object of the present invention to provide a signal controlled apparatus which may be operated by a single channel signal from a remote location.

Another object of the present invention is to provide a signal control device which is capable of actuating a member in either of two directions and yet which at all times is self-neutralizing upon cessation of the signal.

Another object of the present invention is to provide a signal controlled device which may be economically and simply manufactured on a production line basis.

Another object of the present invention is to provide a signal controlled device which has a relatively low weight and limited overall dimensions such that it may be conveniently and advantageously mounted in a model airplane or the like.

Still another object of the present invention is to provide a signal controlled device which is ruggedly constructed to resist relatively high vibration and inertial loads, and yet which may be easily maintained or repaired in the event of failure of one of its elements.

These and other advantages of the present invention are generally attained by providing in a signal controlled apparatus, driving means for actuating a movable member from a neutral position in a first direction and second direction, respectively. In addition, control means, responsive to the signal, are provided to effect energization of the driving means so as to effect actuation of the movable member in the first direction. The control means are responsive to cessation of the signal to effect automatic return movement of the member to the neutral position.

Furthermore, the control means are so constructed as to be responsive to a second signal during the return movement of the member to effect energization of the driving means so as to cause actuation of the movable member in a second direction. Upon cessation of the second signal, the control means are adapted to cause automatic return movement of the member to the neutral position.

Thus, the signal controlled apparatus of the present invention embodies driving means and control means such that in response to a first signal, the device is actuated so as to move the member in a first direction and to automatically return the member to a neutral position as soon as the signal ceases. In the event, it is desired to actuate the member in a second direction, it is merely necessary to send a second pulse or signal as the member is returning to its neutral position. In such event, the member will override its neutral position and movement will be effected in the second direction until the second signal ceases. Thereafter, the member will automatically again return to its neutral position.

A better understanding of the present invention will be had by reference to the drawings, merely illustrating a schematic embodiment of the present invention, and in which.

Figure 1:
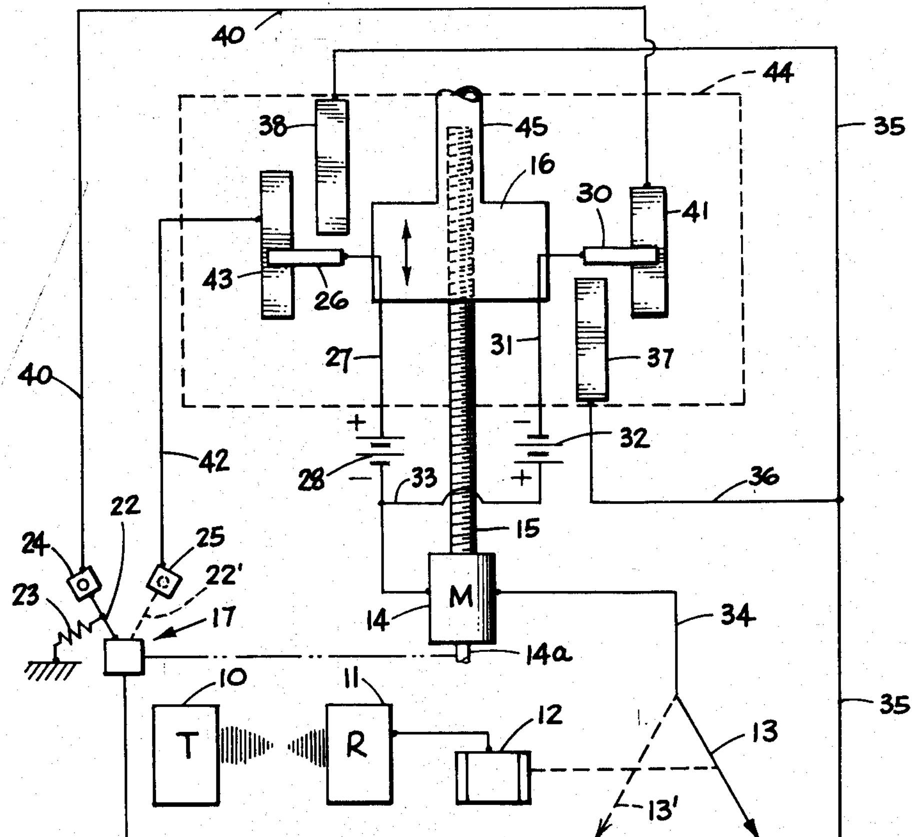
FIGURE 1 is a schematic circuit of the present invention.

Referring now to the drawings, there is shown in FIGURE 1 a schematically indicated transmitter 10 which, in conventional practice, is actuated by an operator on the ground to send signal pulses to signal-responsive apparatus in the model airplane for the control thereof. Towards this end, a receiver 11 is schematically shown and would normally be disposed in the model airplane.

In response to a signal from the transmitter 10, the receiver 11 is adapted to actuate a relay 12 to move a switch arm 13 from a first position as shown in FIGURE 1 to a second position as indicated by the dotted line shown at 13'. The switch arm 13 is normally biased towards its solid line position as indicated.

The signal controlled apparatus in the airplane includes a servo motor 14 having a shaft 14_a_. The motor has rotatably coupled thereto transmission means in the form of a lead screw 15 and/or suitable gearing.

A movable member 16 is threadingly coupled to the lead screw 15 such that according to the direction of rotation of the lead screw 15 and motor 14, the movable member 16 will be either actuated in a first upward direction or second lower direction as indicated by the double ended arrow in FIGURE 1.

The motor 14 also has rotatably coupled thereto an inertia means 17 schematically indicated by the dotted line connection shown in FIGURE 1. The inertia means 17 may have various mechanical embodiments, one such embodiment being illustratively shown in FIGURE 2 as including a star wheel 18. The star wheel 18 is coupled to the shaft of the motor 14 and is adapted to co-operate with a bifurcated member 19 through an arm 20. The arm 20 is pivotably coupled to the bifurcated member 19 at 21 and to the motor shaft 14_a_ as indicated. The arm 20 further includes an upwardly depending movable contact 22.

Normally, the movable contact 22 is biased by a spring 23 towards a stationary contact 24.

With such an arrangement, counter clockwise rotation of the motor 14 and coupled wheel 18 will tend to maintain the movable contact 22 in connection with the stationary contact 24. On the other hand, upon clockwise rotation of the motor 14 and wheel 18, the teeth of the wheel 18 impacting the pallets of the member 19 will tend to overcome the action of the spring 23 and maintain the movable contact 22 in connection with the stationary contact 25.

It will be apparent to those skilled in the art that other types of inertia mechanisms may be employed which are effective to actuate the movable contact 22 between the stationary contact 24 and stationary contact 25 according to the particular direction of rotation of the motor 14.

The movable member 16, in an illustrative form of the present invention, has coupled thereto for movement therewith a movable contact 26 electrically connected through a line 27 to the positive side of a battery 28. The negative side of the battery 28 connects through a line 29 to the motor 14.

The movable member 16 also has coupled for movement therewith a movable contact 30 electrically connected through line 31 to the negative side of a battery 32. The positive side of the battery 32 is connected through a line 33 back to the line 29 to the motor 14.

The motor 14 has another lead 34 which is normally connected through the switch arm 13 to a line 35. The line 35 branches to connect with a pair of stationary neutralizing conductors. Thus, the line 35 connects through a line 36 to stationary conductor 37 and also connects directly with a stationary conductor 38.

Figure 2:
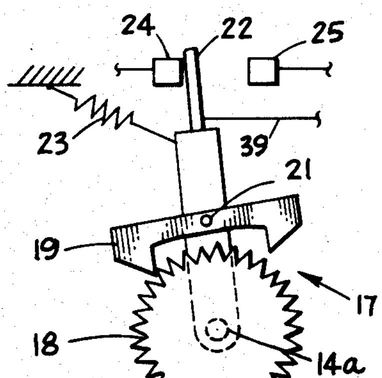
FIGURE 2 is a schematic view of an inertia actuated mechanism employed in conjunction with the schematic circuit of FIGURE 1.

With the switch arm 13 disposed in its dotted line position 13′, the motor lead 34 connects to a line 39 terminating in a connection with the movable contact or switch arm 22 of the inertia means 17. Thereafter, assuming that the movable contact 22 is in its normal position as shown in FIGURES 1 and 2, the line 39 is connected through the inertia means 17 to a line 40 terminating in an actuating conductor 41.

In the event that the movable contact 22, because of rotation of the motor 14, is pressed against stationary contact 25, then line 39 connects through the inertia means 17 to a line 42 terminating in an actuating conductor 43.

The insulating supporting means for the various neutralizing and actuating conductors has been schematically indicated by the dotted line representation at 44.

Furthermore, it is to be appreciated that the end objective of movement of the movable member 16 in either of the directions indicated is to in turn actuate, for example, a rudder control on the aircraft. Thus, the movable member 16 would have connected thereto an actuating arm or the like 45 (which is shown broken away in FIGURE 1) which would in turn be coupled through appropriate linkage means to the rudder control.

The operation of the improved signal controlled apparatus of the present invention may now be described. For illustrative purposes, it may be assumed that the arm 45 when moved upwardly as viewed in FIGURE 1, will actuate a rudder, for example, to the right and when moved downwardly will actuate the rudder to the left.

It will be appreciated that prior to sending of a signal from the transmitter 10 that the motor 14 is deenergized since the lines 35 and 36 connecting with neutralizing conductors 38 and 37, respectively, are open.

With the above in mind, the operator on the ground, to actuate the rudder to the right, merely continuously sends or maintains a signal to the airplane such that the switch arm 13 is moved to the dotted line position 13′.

As soon as the switch arm 13 assumes its dotted line position 13′, in response to the signal, a circuit will be established through line 39, auxiliary switch arm 22, and line 40 to the actuating conductor 41 and thereafter back through the movable contact 30 and line 31 to connect through lines 33 and 29 to complete the circuit through the motor. Upon closing of this circuit, it will be assumed that the motor 14 will rotate in a counter clockwise direction such that the member 16 tends to be unthreaded from the lead screw 15 and advance upwardly in the view of FIGURE 1. At the same time, the star wheel 18, in FIGURE 2 will be rotating counter clockwise to maintain the movable contact 22 in connection with the stationary contact 24 and maintain the circuit.

As the member 16 moves upwardly, the movable contact 30 coupled thereto will remain in contact with the conductor 41 until it moves off the upper end of the conductor 41. At this time the circuit will be broken and it is assumed that through proper linkages and the like that the arm 45 will have actuated the rudder to a full right position.

So long as the signal is being sent without interruption from the transmitter 10, the rudder will remain in the full right position. However, as soon as cessation of the signal occurs, the circuit will be broken by the switch arm 13 returning to its biased solid line position. At the moment the switch arm returns to its solid line position 13, a circuit will be established from the motor 14 through the lines 34 and 35 to the neutralizing conductor 38. Thereafter, since the movable contact 26 is now in contact with the neutralizing conductor 38, a circuit will be completed through the movable contact 26, line 27, and battery 28, to connect with motor 14 through lead 29. It will also be appreciated that since the circuit is now through battery 28, a reverse polarity will be applied to the motor 14 which will cause it to rotate in a clockwise direction to in turn effect downward movement of the member 16, as seen in FIGURE 1. At the same time, the star wheel 18 will also be reversed in direction of rotation such that the movable contact 22 will be maintained in connection with the stationary contact 25 as long as wheel 18 continues to rotate.

The member 16 will continue to move downwardly until the movable contact 26 is disconnected from the lower end of the neutralizing conductor 38 whereby the movable contacts 26 and 30 will assume the normal neutral position of FIGURE 1.

It will be appreciated that in the event only partial movement towards a right rudder position is desired, the signal may be released from the transmitter 10 at any time during movement of the movable contact 39 on the actuating conductor 41 whereby the neutralizing conductor 38 in contact with the movable contact 26 will return the movable contacts 26 and 39 to the neutral position of FIGURE 1.

In the event that the operator desires to actuate the rudder to a left position, a first signal is applied to establish a circuit through the actuating conductor 41 in the same manner as if the right rudder were to be applied, as heretofore described. However, instead of allowing the movable contacts 26 and 30 to return to the neutralizing position of FIGURE 1 upon cessation of the signal, a second signal is applied prior to the time the motor 14 stops revolving in a clockwise direction. So long as the second signal is applied before the motor 14 and its coupled star wheel 18 stop revolving, it will be appreciated, as heretofore mentioned, that the movable contact 22 will then be in connection with the stationary contact 25.

As a consequence, a circuit will be established from the motor 14 through the switch 13 in its dotted line position 13′, through the line 39 and the arm 22 in its dotted line position 22′ to the line 42 and the actuating conductor 43. The circuit will be completed through the movable contact 26 and down through the line 27 and battery 28 to connect through lead 29 to the motor. It will be noted that as a consequence of the establishment of this latter circuit, the movable member 16 will continue to move downwardly past the neutral position until such time as the movable contact 26 is disconnected from the lower end of the actuating conductor 43.

At this time by establishing proper linkages, and the like, the rudder will be disposed in its full left position. The rudder will remain in this position until cessation of the second signal such that the switch arm 13 returns to its normal solid position.

At this time a circuit will be established through the motor 14 to the lines 34, 35, and 36 to the neutralizing conductor 37. It will be appreciated, in this regard, that at the time the movable contact 26 leaves the actuating conductor 43 that the movable contact 30 will be in engagement with the neutralizing conductor 37.

Thus, a circuit will be completed through the neutralizing conductor 37, movable contact 30, and thereafter through the line 31 and through the battery 32 to the motor 14.

When the latter circuit is completed, the motor will again be energized in a counter clockwise direction causing upward movement of the movable member 16 and also causing the movable contact 22 to again be connected to the stationary contact 24. The movable contacts 26 and 30 will move until such time as the movable contact 30 leaves the neutralizing conductor 37 to assume the neutral position as indicated in FIGURE 1.

It will be appreciated from the foregoing description of the operation that at least one of the movable contacts 26 or 30 is, during movement of the member 16, in engagement with a neutralizing conductor. Thus, during upward movement according to the view of FIGURE 1, of the member 16, the movable contact 26 is in engagement with the neutralizing conductor 38 continuously as the movable contact 30 moves in connection with the actuating conductor 41 to finally break contact therewith. Similarly, during downward movement of the member 16, a neutralizing conductor 37 is in engagement with the movable contact 30 continuously as the movable contact 26 rides on the actuating conductor 43 until the connection is broken thereto.

It is also important to note that the particular neutralizing conductor and its co-operating actuating conductor are necessarily connected through a different battery so that the direction of rotation of the motor may be changed.

For purposes of a schematic illustration, considerable spacing has been shown between the lower end of the neutralizing conductor 38 and the movable contact 26 and similarly between the upper end of the neutralizing conductor 37 and the movable contact 30. Of course, in actual practice, this spacing would be considerably less such that immediately upon energization of the motor 14, one of the movable contacts would move into engagement with a neutralizing conductor. Otherwise, the condition might occur in which the rudder or other component being controlled could assume a slight position off center according to variation in the neutral position of the movable members 26 and 30.

It will also be appreciated that the particular physical embodiment of the motor, transmission means, movable contacts, and neutralizing and actuating conductors can be varied to a great extent. For example, through appropriate gearing a back and forth arcuate motion could be employed instead of the linear motion depicted. The essential factor is that the motor actuate a member in at least two directions.

It will thus be appreciated that many changes and modifications may be made in the signal controlled apparatus of the present invention without departing from the basic spirit and scope of the invention as set forth in the following claims.

What is claimed is:

1. In a signal controlled apparatus: driving means for actuating a movable member from a given neutral position in a first direction and second direction, respectively; control means responsive to a first said signal to effect energization of said driving means so as to effect actuation of said movable member in said first direction; said control means being responsive to cessation of said first signal to effect automatic return movement of said member to said neutral position, and said control means being responsive to a second successive signal during said return movement to effect energization of said driving means so as to effect actuation of said movable member past said neutral position in said second direction, said control means being responsive to cessation of said second signal to effect automatic return movement of said member to said neutral position.

2. The subject matter according to claim 1, in which said driving means comprises an electric motor, and electric power means adapted for connection by said control means.

3. A signal controlled apparatus comprising: a motor; first electrical power means connected to one side of and adapted to effect rotation of said motor in one direction; second electrical power means connected to said one side of and adapted to effect rotation of said motor in an opposite direction; a main switch arm adapted to move between a neutral position and an actuating position, said main switch arm normally being disposed in said neutral position; means responsive to said signal for actuating said main switch arm to said actuating position; a first and second neutralizing conductor stationarily secured in said apparatus and connected in parallel to the other side of said motor when said main switch arm is in said neutral position; an auxiliary switch arm coupled for movement between one position and another position in response to, respective, rotation of said motor, said auxiliary arm being normally biased towards one position; a first actuating conductor connected to said motor when said auxiliary switch arm is in said one position and said main arm is in said actuating position; a second actuating conductor connected to said motor when said auxiliary switch arm is in said another position and said main arm is in said actuating position; first and second movable contacts actuated from a given neutral position in a first direction and in a second direction in coupled responsive relationship to, respective, directional rotation of said motor; said first movable contact being connected to said first power means and positioned to engage, respectively, said first actuating conductor and said second neutralizing conductor; said second movable contact being connected to said second power means and positioned to engage, respectively, said second actuating conductor and said first neutralizing conductor, said first actuating conductor being positioned for engagement by said first movable contact in said neutral position such that movement of said main switch arm to said actuating position will close a circuit causing said one directional rotation of said motor such that said first and second movable contacts will be actuated in said first direction, said first actuating conductor being further positioned so as to be disengaged from said first movable contact upon a given movement of said movable contact in said first direction; said first neutralizing conductor being disengaged from said second movable contact at said neutral position and engaged after initial movement thereof in said direction continuously throughout said given movement in said first direction, whereby upon movement of said main switch back to said neutral position a circuit will be closed effecting rotation of said motor in said opposite direction such that said first and second movable contacts will be actuated in said second direction to said neutral position.

4. A signal controlled apparatus, according to claim 3, in which said second actuating conductor is engaged by said second movable contact in said neutral position, and in which said second actuating conductor is positioned so as to be disengaged from said second movable contact after a given movement thereof in said second direction.

5. A signal controlled apparatus, according to claim 4, in which said second neutralizing conductor is disengaged from said first movable contact at said neutral position and engaged upon initial movement thereof continuously throughout said given movement in said second direction.

6. A signal controlled apparatus, according to claim 3, in which said first actuating conductor is positioned so as to be disengaged from said first movable contact upon said movement thereof in said second direction.

7. In a signal controlled apparatus: driving means for actuating a movable member from a given neutral position in a first direction and second direction, respectively; control means responsive to a first said signal to effect energization of said driving means so as to effect actuation of said movable member in said first direction; said control means being responsive to cessation of said first signal to effect automatic return movement of said member to said neutral position, and said control means being responsive to a second successive signal during said return movement to effect energization of said driving means so as to effect actuation of said movable member past said neutral position in said second direction.

8. The subject matter according to claim 7, in which said control means includes inertia means coupled to said driving means co-operating therewith to effect actuation of said movable member past said neutral position in response to said second successive signal.

9. The subject matter, according to claim 7, in which said control means includes first limit means de-energizing said driving means after a given movement of said movable member in said first direction in response to said first signal.

10. The subject matter, according to claim 9, in which said control means further includes second limit means de-energizing said driving means after a given movement of said movable member in said second direction past said neutral position in response to said second signal.

11. In a signal controlled apparatus: driving means for actuating a movable member from a given neutral position in a first direction and second direction, respectively; control means responsive to a first said signal to effect energization of said driving means so as to effect actuation of said movable member in said first direction; said control means being responsive to cessation of said first signal to effect automatic return movement of said member to said neutral position, and said control means being responsive to a second successive signal during said return movement to effect energization of said driving means so as to effect actuation of said movable member past said neutral position in said second direction, said control means being responsive to cessation of said second signal to effect automatic return movement of said member to said neutral position, said control means including inertia means coupled to said driving means co-operating therewith to effect actuation of said movable member past said neutral position in response to said second signal.

12. The subject matter according to claim 11, in which said control means includes first limit means de-energizing said driving means after a given movement of said movable member in said first direction in response to said first signal.

13. The subject matter, according to claim 12, in which said control means includes second limit means de-energizing said driving means after a given movement of said movable member in said second direction past said neutral position in response to said second signal.

References Cited in the file of this patent

UNITED STATES PATENTS

| | | |
|---|---|---|
| 1,419,376 | Hammond | July 13, 1922 |
| 2,166,316 | O'Hagan | July 18, 1939 |
| 2,441,149 | Hays | May 11, 1948 |